US009739320B2

United States Patent
Ishitani et al.

(10) Patent No.: US 9,739,320 B2
(45) Date of Patent: Aug. 22, 2017

(54) CAM CLUTCH

(71) Applicant: MITSUBISHI ELECTRIC CORPORATION, Chiyoda-ku, Tokyo (JP)

(72) Inventors: Seiki Ishitani, Tokyo (JP); Daisuke Yoshida, Tokyo (JP); Tomohito Mori, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/911,371

(22) PCT Filed: Sep. 4, 2013

(86) PCT No.: PCT/JP2013/073846
§ 371 (c)(1),
(2) Date: Feb. 10, 2016

(87) PCT Pub. No.: WO2015/033409
PCT Pub. Date: Mar. 12, 2015

(65) Prior Publication Data
US 2016/0195146 A1    Jul. 7, 2016

(51) Int. Cl.
*F16D 41/07* (2006.01)
*F16D 41/06* (2006.01)
(52) U.S. Cl.
CPC ...... *F16D 41/07* (2013.01); *F16D 2041/0603* (2013.01); *F16D 2041/0605* (2013.01)
(58) Field of Classification Search
CPC ........... F16D 2041/0603; F16D 41/069; F16D 41/073
(Continued)

(56) References Cited

U.S. PATENT DOCUMENTS 3,119,481 A    1/1964  Fuchs
3,527,327 A *  9/1970  McCreary ............. B25B 21/004
                                        192/103 B
(Continued)

FOREIGN PATENT DOCUMENTS

DE    10 2008 008 188 A1    8/2009
JP        60-225315 A      11/1985
(Continued)

OTHER PUBLICATIONS

International Search Report (PCT/ISA/210) issued on Oct. 22, 2013, by the Japanese Patent Office as the International Searching Authority for International Application No. PCT/JP2013/073846.
(Continued)

*Primary Examiner* — Mark Manley
(74) *Attorney, Agent, or Firm* — Buchanan Ingersoll & Rooney PC

(57) ABSTRACT

To provide a cam clutch including an outer ring, an inner ring provided inside of the outer ring, a plurality of cams inserted between the outer ring and the inner ring, and an annular spring. A line connecting a first abutment portion between the outer ring and each of the cams and a second abutment portion between the inner ring and the cam and a line passing the second abutment portion form an angle in a state with the cams engaging with the outer ring and the inner ring. Rotation of the outer ring and the inner ring is enabled in the respective one directions while rotation thereof is restricted in the respective other directions. A groove is formed on an inner periphery of the outer ring or an outer periphery of the inner ring.

2 Claims, 7 Drawing Sheets

(58) Field of Classification Search
USPC .................................................. 192/45.002
See application file for complete search history.

(56) References Cited

U.S. PATENT DOCUMENTS

| | | | |
|---|---|---|---|
| 4,762,971 A | 8/1988 | Yabe | |
| 5,064,037 A * | 11/1991 | Long, Jr. | F16D 41/07 |
| | | | 192/104 B |
| 5,853,073 A * | 12/1998 | Costin | F16D 41/12 |
| | | | 192/103 B |
| 5,901,838 A | 5/1999 | Nakatani et al. | |

FOREIGN PATENT DOCUMENTS

| | | |
|---|---|---|
| JP | 61-202725 U | 12/1986 |
| JP | 3-89230 U | 9/1991 |
| JP | 5-92545 U | 12/1993 |
| JP | 8-021292 B2 | 3/1996 |
| JP | 9-161624 A | 6/1997 |
| JP | 9-177840 A | 7/1997 |
| JP | 10-294032 A | 11/1998 |
| JP | 2001-295867 A | 10/2001 |
| JP | 2001-355653 A | 12/2001 |
| JP | 2002-174271 A | 6/2002 |
| JP | 2004-257438 A | 9/2004 |
| JP | 2004-316873 A | 11/2004 |
| JP | 2007-092958 A | 4/2007 |
| JP | 2007-255553 A | 10/2007 |

OTHER PUBLICATIONS

Written Opinion (PCT/ISA/237) issued on Oct. 22, 2013, by the Japanese Patent Office as the International Searching Authority for International Application No. PCT/JP2013/073846.

* cited by examiner

CAM CLUTCH

FIELD

The present invention relates to a cam clutch.

BACKGROUND

Conventionally, a cam clutch in which a plurality of cams are inserted between an outer ring having a cylindrical shape and an inner ring having a columnar or cylindrical shape has been used. In the cam clutch, a line connecting an abutment portion between the outer ring and each of the cams and an abutment portion between the inner ring and the same cam and a line extending from a rotation shaft of the inner ring or the outer ring and passing the abutment portion form an angle (also referred to as "strut angle") in a state with the cams engaging with the outer ring and the inner ring, so that rotation of the outer ring and the inner ring in one direction is enabled while rotation thereof in the other direction is restricted (see, for example, Patent Literature 1). An annular spring is inserted between the inner ring and the outer ring to maintain a posture in which the cams abut on the inner ring and the outer ring, with the line connecting the abutment portion between the outer ring and each of the cams and the abutment portion between the inner ring and the same cam and the line extending from the rotation shaft of the inner ring or the outer ring and passing the abutment portion forming an angle in a state with the cams engaging with the outer ring and the inner ring.

CITATION LIST

Patent Literature

Patent Literature 1: Japanese Utility Model Laid-open Publication No. H3-89230

SUMMARY

Technical Problem

The annular spring abuts on projecting portions projecting from the cams to hold the postures of the cams. However, due to change in the postures of the cams at the time of rotation of the inner ring and the outer ring, the spring may be deformed by the projecting portions of the cams, which may break the spring.

The present invention has been achieved in view of the above problem, and an object of the present invention is to provide a cam clutch in which the spring is less likely to be broken by the cams whose postures are changed.

Solution to Problem

According to an aspect of the present invention in order to solve the problems and achieve the objects, there is provided a cam clutch including: an outer ring having a cylindrical shape; an inner ring provided inside of the outer ring and having a columnar or cylindrical shape; a plurality of cams inserted between the outer ring and the inner ring; and an annular spring that biases the cams toward the outer ring or the inner ring, a line connecting a first abutment portion between the outer ring and each of the cams and a second abutment portion between the inner ring and the cam and a line extending from a rotation shaft of the inner ring or the outer ring and passing the second abutment portion forming an angle in a state with the cams engaging with the outer ring and the inner ring, and rotation of the outer ring and the inner ring being enabled in the respective one directions while rotation thereof being restricted in the respective other directions, wherein a groove is formed on an inner periphery of the outer ring or an outer periphery of the inner ring at a portion opposite to a biasing direction of the spring, the cams each have an inner-ring abutment portion having a semi-circular columnar shape extending along an axial direction of the outer ring and abutting on the inner ring, and an outer-ring abutment portion integrally formed on an outer ring side of the cam with respect to the inner-ring abutment portion and abutting on the outer ring, projecting portions projecting along the axial direction are formed respectively on end faces on opposite sides of the outer-ring abutment portion along the axial direction, the spring abuts on the projecting portions and biases the cams toward the outer ring, and an end of each of the projecting portions in a direction enabling rotation of the outer ring has a first notched portion notched to an inner side than the outer-ring abutment portion, and the first notched portion is formed in a curved surface whose radius is R having a radius smaller than that of the semi-circular columnar shape, centering on a central axis of the semi-circular columnar shape of the inner-ring abutment portion, as viewed along the axial direction.

Advantageous Effects of Invention

According to the present invention, a cam clutch in which the spring is less likely to be broken by the cams whose postures are changed can be provided.

DESCRIPTION OF EMBODIMENTS

Exemplary embodiments of a cam clutch according to the present invention will be explained below in detail with reference to the accompanying drawings. The present invention is not limited to the embodiments.

First embodiment

Figure 1:
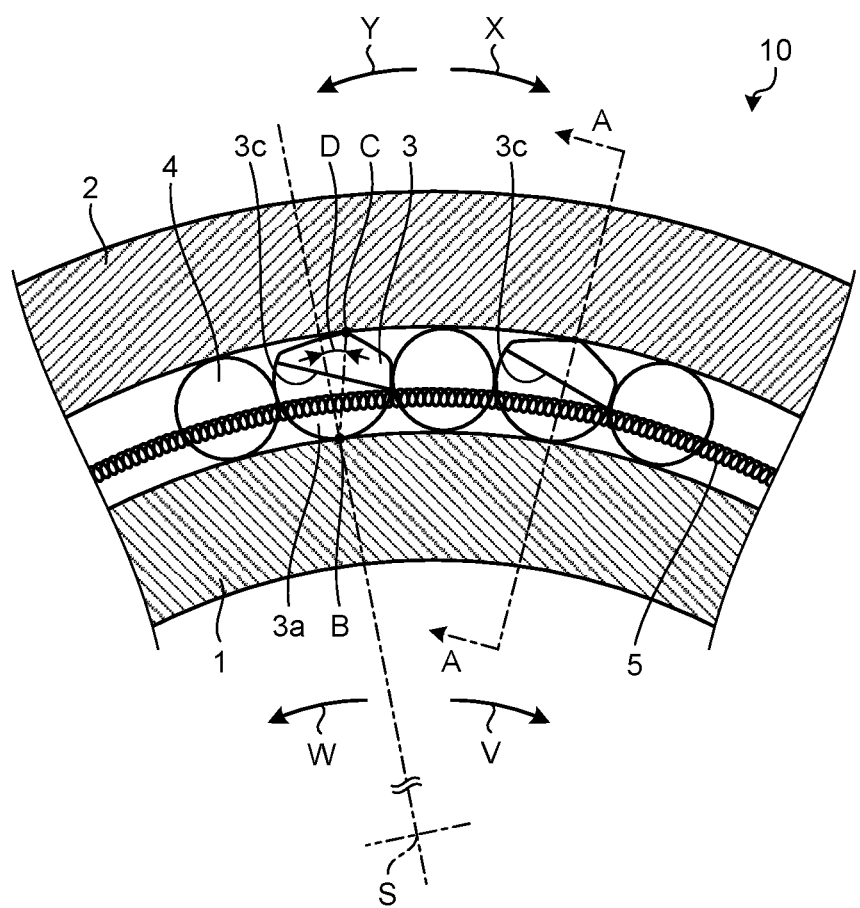
FIG. 1 is a partially enlarged view of a cam clutch according to a first embodiment of the present invention, as viewed along a direction of a shaft.
Figure 2:
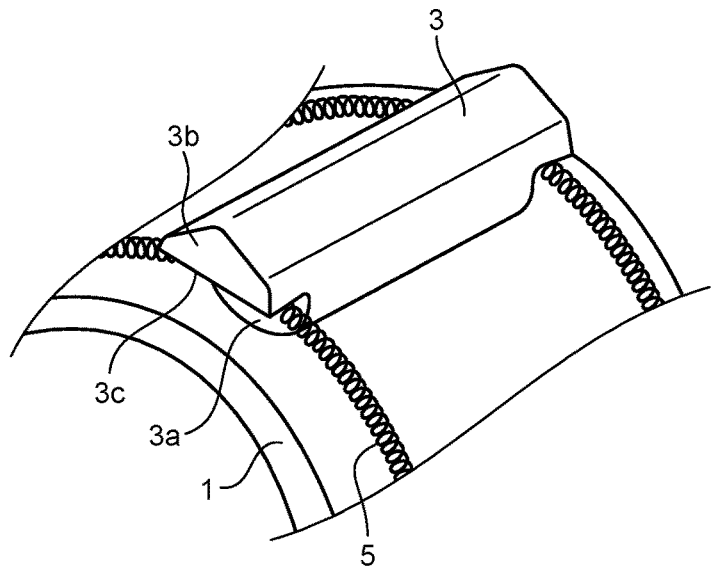
FIG. 2 is a partially enlarged perspective view enlargedly illustrating a portion of a cam.
Figure 3:
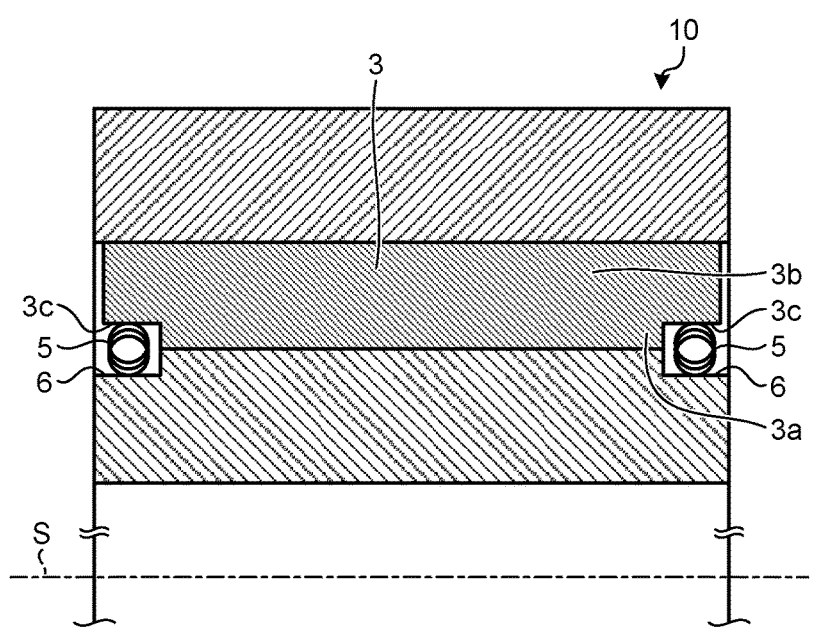
FIG. 3 is a cross-sectional arrow view along a line A-A illustrated in FIG. 1.

FIG. 1 is a partially enlarged view of a cam clutch 10 according to a first embodiment of the present invention, as viewed along a direction of a shaft S. FIG. 2 is a partially enlarged perspective view enlargedly illustrating a portion of a cam 3. FIG. 3 is a cross-sectional arrow view along a line A-A illustrated in FIG. 1. The cam clutch 10 includes an outer ring 2, an inner ring 1, cams 3, rollers 4, and springs 5.

The outer ring 2 has a cylindrical shape with the shaft S being a central axis. The outer ring 2 is, for example, made of metal. The inner ring 1 is inserted inside of the outer ring 2. The inner ring 1 has a cylindrical shape centering on the shaft S. The inner ring 1 is, for example, made of metal.

A gap extending along a circumferential direction at a fixed distance is formed between the outer ring 2 and the inner ring 1. It is adequate that the shapes of the outer ring 2 and the inner ring 1 are shapes that form the gap extending along the circumferential direction at a fixed distance between the outer ring 2 and the inner ring 1 and, for example, the inner ring 1 may have a columnar shape.

The cams 3 are inserted between the outer ring 2 and the inner ring 1. The cams 3 have a shape close to a columnar shape extending in the direction of the shaft S as a whole. The cams 3 are, for example, made of metal. The cams 3 each have an inner-ring abutment portion 3a abutting on an outer periphery of the inner ring 1, and an outer-ring abutment portion 3b abutting on an inner periphery of the outer ring 2.

When it is assumed that a portion where one of the cams 3 abuts on the inner ring 1 is a second abutment portion B and a portion where the same cam 3 abuts on the outer ring 2 is a first abutment portion C, a line extending from the shaft S passing through the second abutment portion B and a line connecting the second abutment portion B and the first abutment portion C form an angle D.

Because the cams 3 abut on the outer ring 2 and the inner ring 1 with the angle D, the outer ring 2 can be rotated in a direction indicated by an arrow X and, in a direction indicated by an arrow Y, the cams 3 engage with the outer ring 2 and the inner ring 1 to restrict rotation thereof. Similarly, rotation of the inner ring 1 is enabled in a direction indicated by an arrow W and rotation thereof is restricted in a direction indicated by an arrow V.

Projecting portions 3c projecting along the direction of the shaft S are formed at end faces on opposite sides of the outer-ring abutment portion 3b along the direction of the shaft S, respectively. In the present embodiment, by forming the outer-ring abutment portion 3b to be longer than the inner-ring abutment portion 3a along the direction of the shaft S, the projecting portions 3c are formed.

The rollers 4 are inserted between the outer ring 2 and the inner ring 1. The rollers 4 have a columnar shape extending along the direction of the shaft S. The rollers 4 are, for example, made of metal. The rollers 4 abut on the outer ring 2 and the inner ring 1 without having the angle D so as to rotate the outer ring 2 and the inner ring 1 smoothly. In the present embodiment, the cams 3 and the rollers 4 are provided alternately. However, the ratio in the number of the cams 3 and the rollers 4 is not limited thereto and can be changed appropriately.

The springs 5 have an annular shape and are fitted to the inner sides of the projecting portions 3c of the cams 3 to bias the projecting portions 3c toward the outer ring 2. Because the projecting portions 3c are biased by the springs 5, the angle D of the cams 3 is maintained.

Grooves 6 are formed on the outer periphery of the inner ring 1 at portions facing the springs 5, that is, at portions opposite to a biasing direction of the springs 5 with respect to the springs 5, respectively. The grooves 6 are formed in a whole area along the circumferential direction with respect to the outer periphery of the inner ring 1.

Figure 4:
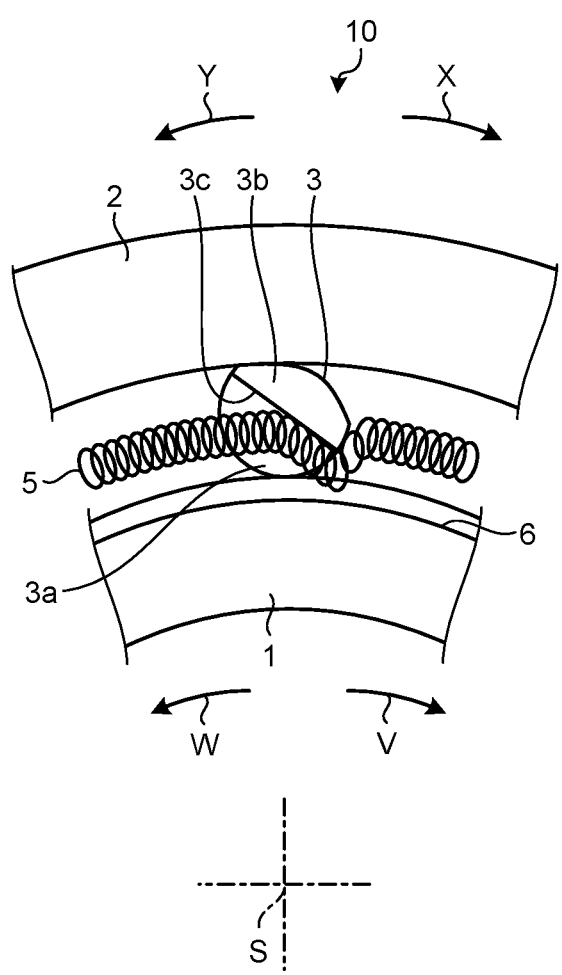
FIG. 4 is a diagram illustrating a state where the posture of a cam has changed at the time of rotation of an inner ring or an outer ring.

FIG. 4 is a diagram illustrating a state where the posture of the cam 3 has changed at the time of rotation of the inner ring 1 or the outer ring 2. As illustrated in FIG. 4, when the inner ring 1 or the outer ring 2 rotates, the posture of the cam 3 may change (rotate) against the biasing force of the springs 5. When the posture of the cam 3 has changed, the projecting portions 3c may push the springs 5 toward the inner ring 1. Even in such a case, because the grooves 6 are formed on the inner ring 1 at the portions facing the springs 5, the springs 5 can escape into the grooves 6. Therefore, breakage of the springs 5 due to being put between the projecting portions 3c and the inner ring 1 is less likely to occur. Change of the posture of the cam 3 as illustrated in FIG. 4 is likely to occur when the outer ring 2 or the inner ring 1 rotates at a high speed.

Figure 11:
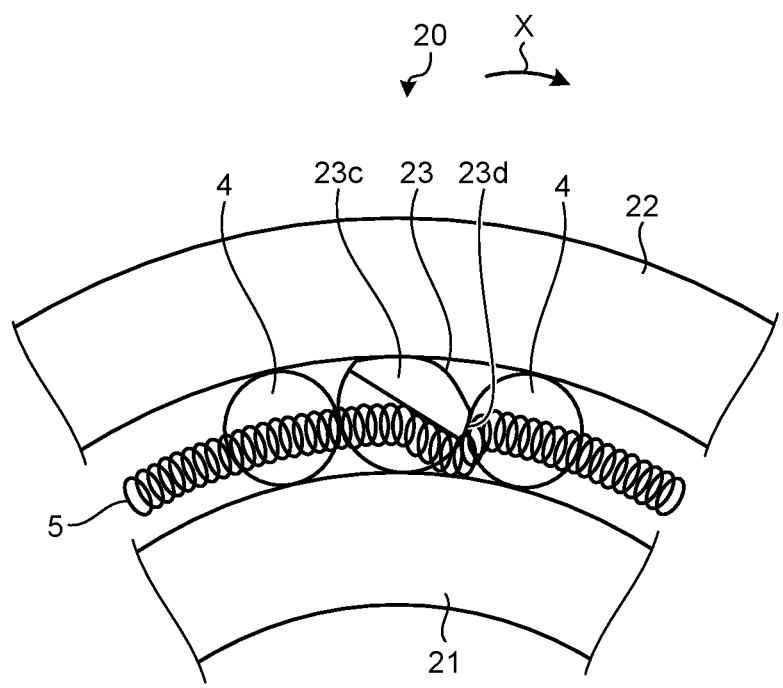
FIG. 11 is a diagram illustrating a state where the posture of a cam has changed at the time of rotation of an inner ring or an outer ring in a cam clutch illustrated as a comparative example.

FIG. 11 is a diagram illustrating a state where the posture of a cam 23 has changed at the time of rotation of an inner ring 21 or an outer ring 22 in a cam clutch 20 illustrated as a comparative example. In the cam clutch 20 illustrated as the comparative example, no groove is formed on an outer periphery of the inner ring 21. Therefore, when the posture of the cam 23 has changed, the springs 5 are likely to be put between projecting portions 23c and the inner ring 21. Therefore, the springs 5 are prone to breakage. Particularly, the springs 5 are likely to be put between ends 23d of the projecting portions 23c on the side of a direction enabling the rotation of the outer ring 22 (a direction indicated by an arrow X), and the inner ring 21. In contrast thereto, according to the present embodiment, by forming the grooves 6 as described above, breakage of the springs 5 are less likely to occur.

In the present embodiment, an example in which the projecting portions 3c are formed on the outer-ring abutment portion 3b and the projecting portions 3c are biased toward the outer ring 2 by the springs 5 has been described. However, in a configuration in which projecting portions are formed on the inner-ring abutment portion 3a and are biased toward the inner ring 1 by the springs 5, it is adequate that the grooves 6 are formed on the inner periphery of the outer ring 2 at portions facing the springs 5.

Figure 5:
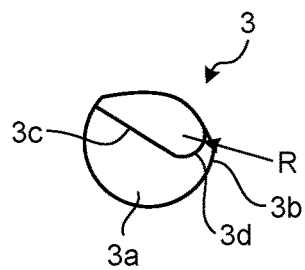
FIG. 5 is a diagram illustrating a cam according to a first modification, as viewed along a direction of a shaft.

FIG. 5 is a diagram illustrating the cam 3 according to a first modification, as viewed along the direction of the shaft S. In the first modification, ends (first notched portion) 3d of the projecting portions 3c on the side of a rotatable direction of the outer ring 2 (a direction indicated by an arrow X) are notched to an inner side than the outer-ring abutment portion 3b. When viewed along the direction of the shaft S, the end 3d is formed as a curved surface (a circular arc) whose radius is R.

Figure 6:
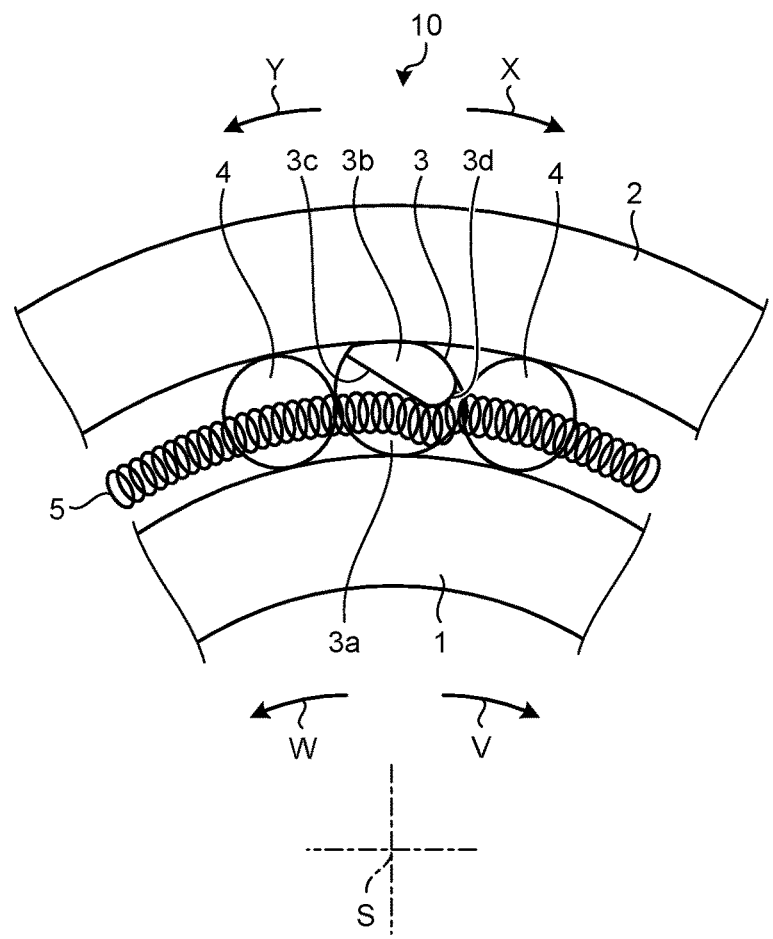
FIG. 6 is a diagram illustrating a state where the posture of the cam according to the first modification has changed at the time of rotation of an inner ring or an outer ring.

FIG. 6 is a diagram illustrating a state where the posture of the cam 3 according to the first modification has changed at the time of rotation of the inner ring 1 or the outer ring 2. As illustrated also in the comparative example (see FIG. 11), the springs 5 are likely to be put between the ends 23d of the corresponding projecting portions 23c and the inner ring 21, respectively. In contrast thereto, in the first modification, as illustrated in FIG. 6, because the end 3d of each of the projecting portions 3c is notched to the inner side, a gap between each of the projecting portions 3c and the inner ring 1 is larger than that in the comparative example when the posture of the cam 3 has changed. Therefore, the springs 5 are less likely to be put between the projecting portions 3c and the inner ring 1, and breakage of the springs 5 is less likely to occur.

Furthermore, because the end 3d is formed in the curved surface whose radius is R, the end 3d easily comes in contact with the spring 5 not locally but with a plane, and a load applied to the spring 5 can be reduced. Accordingly, breakage of the spring 5 can be more reliably suppressed. The notched end 3d is not limited to having the curved surface whose radius is R and can be formed, for example, in a notch being a straight line as viewed along the direction of the shaft S.

Figure 7:
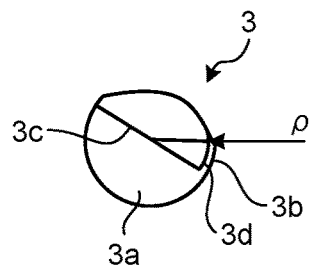
FIG. 7 is a diagram illustrating a cam according to a second modification, as viewed along a direction of a shaft.

FIG. 7 is a diagram illustrating the cam 3 according to a second modification, as viewed along the direction of the shaft S. In the second modification, the ends 3d of the projecting portions 3c are notched to an inner side to form a curved surface whose radius is R similarly to the first modification. In the second modification, the inner-ring abutment portion 3a has a semi-circular columnar shape. The end 3d of each of the projecting portions 3c is formed in a curved surface whose radius is R having a smaller radius p than that of the semi-circular columnar shape, centering on a central axis of the semi-circular columnar shape.

Figure 8:
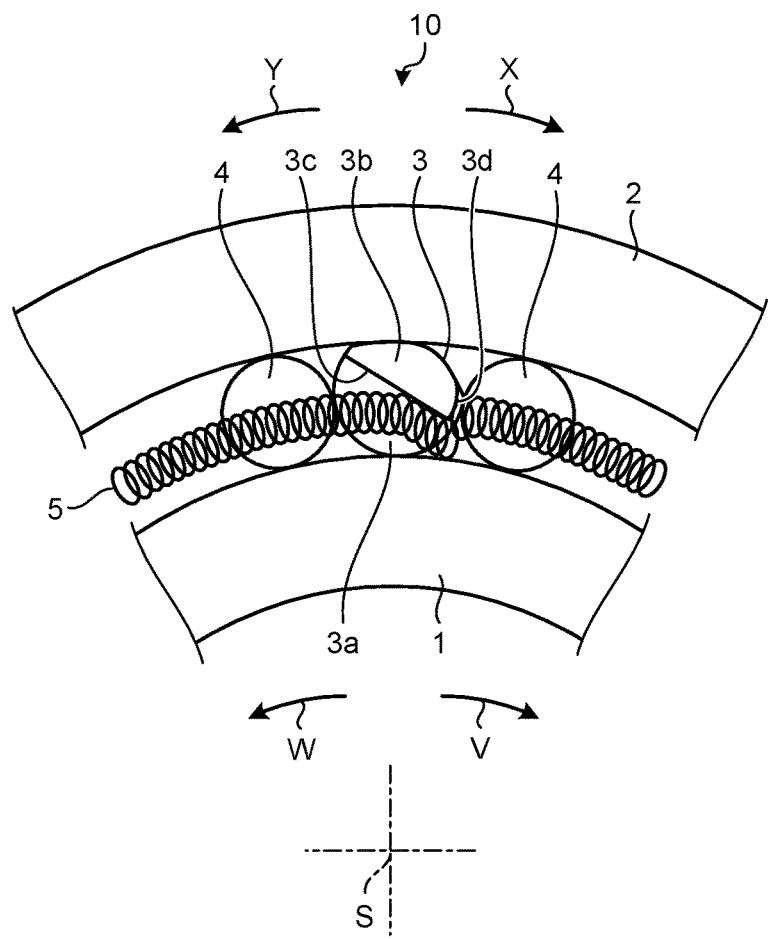
FIG. 8 is a diagram illustrating a state where the posture of the cam according to the second modification has changed at the time of rotation of an inner ring or an outer ring.

FIG. 8 is a diagram illustrating a state where the posture of the cam 3 according to the second modification has changed at the time of rotation of the inner ring 1 or the outer ring 2. Also in the second modification, a gap between each of the projecting portions 3c and the inner ring 1 is larger than that in the comparative example when the posture of the cam 3 has changed. Therefore, the springs 5 are less likely to be put between the projecting portions 3c and the inner ring 1, and the breakage of the springs 5 is less likely to occur.

Further, because the end 3d is formed in the curved surface whose radius is R, the end 3d easily comes in contact with the spring 5 not locally but with a plane, and a load applied to the spring 5 can be reduced. Accordingly, breakage of the spring 5 can be reliably suppressed. The notched end 3d is not limited to having the curved surface whose radius is R and can be formed, for example, in a notch being a straight line as viewed along the direction of the shaft S.

Figure 9:
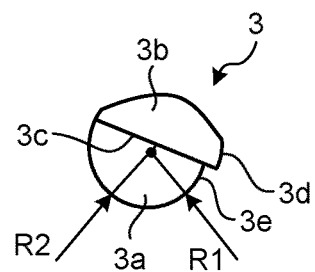
FIG. 9 is a diagram illustrating a cam according to a third modification, as viewed along a direction of a shaft.

FIG. 9 is a diagram illustrating the cam 3 according to a third modification, as viewed along the direction of the shaft S. In the cam 3 according to the third modification, ends (second notched portion) 3e of the inner-ring abutment portion 3a on the side of a rotatable direction of the outer ring 2 (a direction indicated by an arrow X) are notched to an inner side than the outer-ring abutment portion 3b. When viewed along the direction of the shaft S, the ends 3e are formed in a curved surface whose radius is R. The curved surface whose radius is R, formed at the ends 3e, has a radius whose size becomes smaller forward to the end. Therefore, a radius R1 is smaller than a radius R2.

Figure 10:
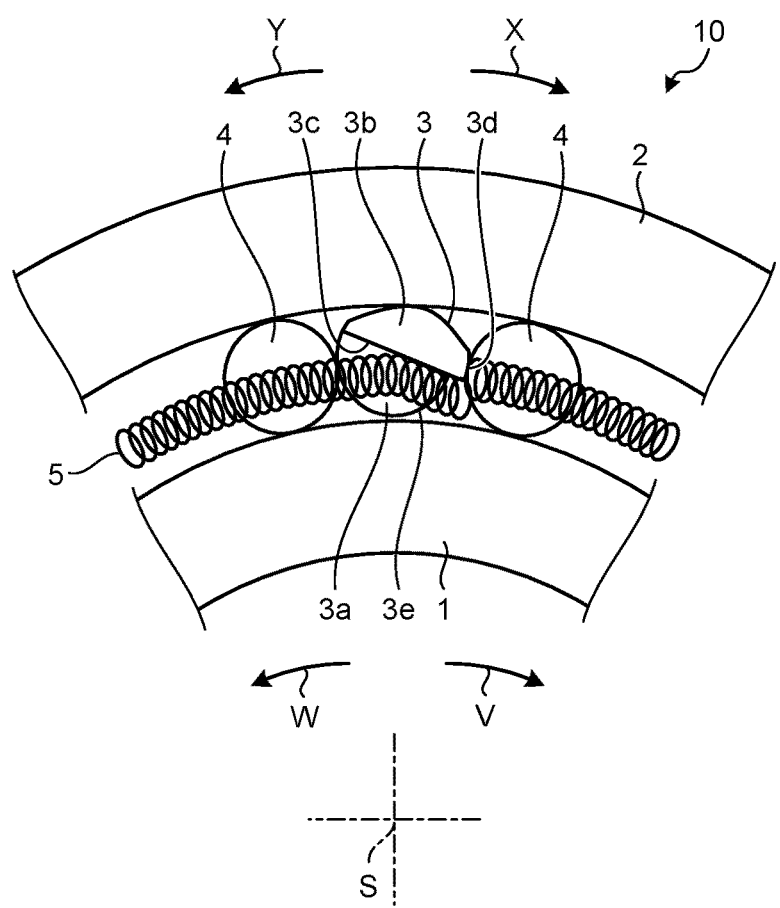
FIG. 10 is a diagram illustrating a state where the posture of the cam according to the third modification has changed at the time of rotation of an inner ring or an outer ring.

FIG. 10 is a diagram illustrating a state where the posture of the cam 3 according to the third modification has changed at the time of rotation of the inner ring 1 or the outer ring 2. In the third modification, because the ends 3e of the inner-ring abutment portion 3a are notched, the inner-ring abutment portion 3a is separated from the inner ring 1 in a process in which the posture of the cam 3 is changing in such a manner that the springs 5 are put between the ends 3d of the projecting portions 3c and the inner ring 1, respectively.

When the inner-ring abutment portion 3a is separated from the inner ring 1, further change in the posture of the cam 3 becomes less likely to occur. Accordingly, a change amount of the posture of the cam 3 in a direction of putting the springs 5 between the projecting portions 3c and the inner ring 1 is limited, and the springs 5 are less likely to be put therebetween. Therefore, breakage of the springs 5 is less likely to occur. The notched ends 3e are not limited to have the curved surface whose radius is R and can be formed, for example, in a notch being a straight line as viewed along the direction of the shaft S.

INDUSTRIAL APPLICABILITY

As described above, the cam clutch according to the present invention is useful for prevention of breakage of the springs.

REFERENCE SIGNS LIST 1 inner ring, 2 outer ring, 3 cam, 3a inner-ring abutment portion, 3b outer-ring abutment portion, 3c projecting portion, 3d end (first notched portion), 3e end (second notched portion), 4 roller, 5 spring, 6 groove, 10 cam clutch, 20 cam clutch, 21 inner ring, 22 outer ring, 23 cam, 23c projecting portion, 23d end, B second abutment portion, C first abutment portion, D angle, S shaft.

The invention claimed is:
1. A cam clutch comprising:
an outer ring having a cylindrical shape;
an inner ring provided inside of the outer ring and having a columnar or cylindrical shape;
a plurality of cams inserted between the outer ring and the inner ring; and
an annular spring that biases the cams toward the outer ring or the inner ring,
a line connecting a first abutment portion between the outer ring and each of the cams and a second abutment portion between the inner ring and the cam and a line extending from a rotation shaft of the inner ring or the outer ring and passing the second abutment portion forming an angle in a state with the cams engaging with the outer ring and the inner ring, and rotation of the outer ring and the inner ring being enabled in the respective one directions while rotation thereof being restricted in the respective other directions, wherein
a groove is formed on an inner periphery of the outer ring or an outer periphery of the inner ring at a portion opposite to a biasing direction of the spring,
the cams each have an inner-ring abutment portion having a semi-circular columnar shape extending along an axial direction of the outer ring and abutting on the inner ring, and an outer-ring abutment portion integrally formed on an outer ring side of the cam with respect to the inner-ring abutment portion and abutting on the outer ring,
projecting portions projecting along the axial direction are formed respectively on end faces on opposite sides of the outer-ring abutment portion along the axial direction,
the spring abuts on the projecting portions and biases the cams toward the outer ring, and
an end of each of the projecting portions in a direction enabling rotation of the outer ring has a first notched portion notched radially inward relative to the outer-ring abutment portion,
the first notched portion is formed as a curved surface whose radius is R and having a radius smaller than that of the semi-circular columnar shape, centering on a central axis of the semi-circular columnar shape of the inner-ring abutment portion, as viewed along the axial direction, and each of the projecting portions has a plane surface passing through the central axis and an angle between the curved surface whose radius is R and the plane surface is an acute angle.

2. A cam clutch, comprising:

an outer ring having a cylindrical shape;

an inner ring provided inside of the outer ring and having a columnar or cylindrical shape;

a plurality of cams inserted between the outer ring and the inner ring; and an annular spring that biases the cams toward the outer ring or the inner ring, a line connecting a first abutment portion between the outer ring and each of the cams and a second abutment portion between the inner ring and the cam and a line extending from a rotation shaft of the inner ring or the outer ring and passing the second abutment portion forming an angle in a state with the cams engaging with the outer ring and the inner ring, and rotation of the outer ring and the inner ring being enabled in the respective one directions while rotation thereof being restricted in the respective other directions, wherein a groove is formed on an inner periphery of the outer ring or an outer periphery of the inner ring at a portion opposite to a biasing direction of the spring and wherein the cams each have an inner-ring abutment portion abutting on the inner ring and an outer-ring abutment portion integrally formed on an outer ring side of the cam with respect to the inner-ring abutment portion and abutting on the outer ring, projecting portions projecting along the axial direction are formed respectively on end faces on opposite sides of the outer-ring abutment portion along an axial direction of the outer ring, a first notched portion provided at an end of the outer-ring abutment portion in a direction enabling rotation of the outer ring;

an end of the inner-ring abutment portion in a direction enabling rotation of the outer ring has a second notched portion that is notched to an inner side than the outer-ring abutment portion and separates the inner-ring abutment portion from the inner ring, and the second notched portion is formed as a curved surface whose radius is R as viewed along the axial direction of the outer ring, and the first notched portion radially projects outward relative to the second notched portion to provide a step between the first notched portion and the second notched portion.

* * * * *